(12) United States Patent
DiBenedetto

(10) Patent No.: US 8,561,411 B2
(45) Date of Patent: Oct. 22, 2013

(54) AIR PARTICLE SEPARATOR FOR A GAS TURBINE ENGINE

(75) Inventor: Enzo DiBenedetto, Torrington, CT (US)

(73) Assignee: United Technologies Corporation, Hartford, CT (US)

( * ) Notice: Subject to any disclaimer, the term of this patent is extended or adjusted under 35 U.S.C. 154(b) by 1320 days.

(21) Appl. No.: 12/552,490

(22) Filed: Sep. 2, 2009

(65) Prior Publication Data

US 2011/0047959 A1    Mar. 3, 2011

(51) Int. Cl.
*F02G 3/00* (2006.01)
(52) U.S. Cl.
USPC .......................................... 60/772; 60/39.092
(58) Field of Classification Search
USPC ................. 60/39.092, 772; 415/121.1, 121.2, 415/168.2; 55/30 B, 306
See application file for complete search history.

(56) References Cited

U.S. PATENT DOCUMENTS

| | | | | |
|---|---|---|---|---|
| 3,733,814 A | * | 5/1973 | Hull et al. | 60/39.092 |
| 4,049,401 A | * | 9/1977 | Smith | 55/401 |
| 4,561,246 A | * | 12/1985 | Hovan | 60/226.1 |
| 4,709,545 A | | 12/1987 | Stevens et al. | |
| 5,123,240 A | * | 6/1992 | Frost et al. | 60/779 |
| 5,402,636 A | | 4/1995 | Mize et al. | |
| 5,619,850 A | | 4/1997 | Palmer et al. | |
| 5,622,438 A | | 4/1997 | Walsh et al. | |
| 6,516,618 B1 | | 2/2003 | Bock | |
| 7,287,384 B2 | | 10/2007 | Fish et al. | |
| 2010/0135769 A1 | * | 6/2010 | Kleynhans et al. | 415/58.4 |

* cited by examiner

*Primary Examiner* — Phutthiwat Wongwian
*Assistant Examiner* — Scott Walthour
(74) *Attorney, Agent, or Firm* — Kinney & Lange, P.A.

(57) ABSTRACT

An assembly for separating debris from a pressurization air flow adjacent to a bearing compartment seal includes a baffle and a capture annulus. The baffle is disposed in the pressurization air flow upstream of the compartment seal. The capture annulus is positioned adjacent the baffle and has a cavity to collect the debris.

19 Claims, 3 Drawing Sheets

AIR PARTICLE SEPARATOR FOR A GAS TURBINE ENGINE

BACKGROUND

The present invention relates to gas turbine engines, and more particularly, to bearing compartments in gas turbine engines.

The rotating shafts and other rotating turbomachinery of gas turbine engines are supported from a non-rotating structure by arrays of anti-friction bearings. In many engines, the anti-friction bearings are enclosed in bearing compartments that are in part bounded by an outer wall circumscribing the engine shafts. A lubricant such as oil is supplied to the bearing compartments to lubricate and cool the anti-friction bearings during operation of the gas turbine engine. The bearing compartments are sealed to protect the anti-friction bearings from debris introduced into the gas turbine engine and to restrict the lubricant from entering undesired areas of the engine. To accomplish bearing compartment sealing, carbon seals are commonly used. Additionally, a high pressure buffer air (also called pressurization air) flow is commonly supplied to the bearing compartments through the seals from sources within the gas turbine engine such as the compressor section. The buffer air aids in restricting the lubricant to bearing compartments.

The high pressure buffer air flow is also used for other purposes including providing a nose cap of an engine fan with anti-icing heat. To create sufficient buffer air flow for all purposes including anti-icing and sealing, an additional seal must be positioned upstream of each bearing compartment seal to create a sufficient back pressure to induce flow. Unfortunately, the upstream seal has been known to generate debris that can be introduced into the bearing compartment seal causing its premature failure.

SUMMARY

An assembly for separating debris from a pressurization air flow adjacent to a bearing compartment seal includes a baffle and a capture annulus. The baffle is disposed in the pressurization air flow upstream of the compartment seal. The capture annulus is positioned adjacent the baffle and has a cavity to collect the debris.

In another aspect, a method for separating debris from a pressurization air flow adjacent a bearing compartment seal comprises directing the pressurization air stream around a baffle disposed upstream of the bearing compartment seal, and capturing the debris in a cavity of a member disposed adjacent the baffle.

DETAILED DESCRIPTION

The present application describes a method and a baffle and capture annulus assembly for separating debris from buffer or pressurization air flow adjacent a bearing compartment seal. The baffle and capture annulus assembly utilizes baffle separation and/or cyclonic or centrifugal separation to allow the debris to be removed and captured from the buffer air flow leaving a cleaner buffer air flow to contact the bearing compartment seal. In particular, the baffle is disposed in the pressurization air flow upstream (as defined by the direction of flow of the pressurization air) of the bearing compartment seal. The capture annulus is disposed adjacent the baffle and has a cavity to collect the debris. Additionally, the capture annulus can include channels that extend through the capture annulus to allow for evacuation of the debris from the cavity to a buffer air supply plenum away from the bearing compartment seal. In this manner, cleaner pressurization air is supplied to the bearing compartment seal and to the bearing compartment within the gas turbine engine. The cleaner buffer air flow helps to reduce the rate of premature failure of the bearing compartment seal.

Figure 1:
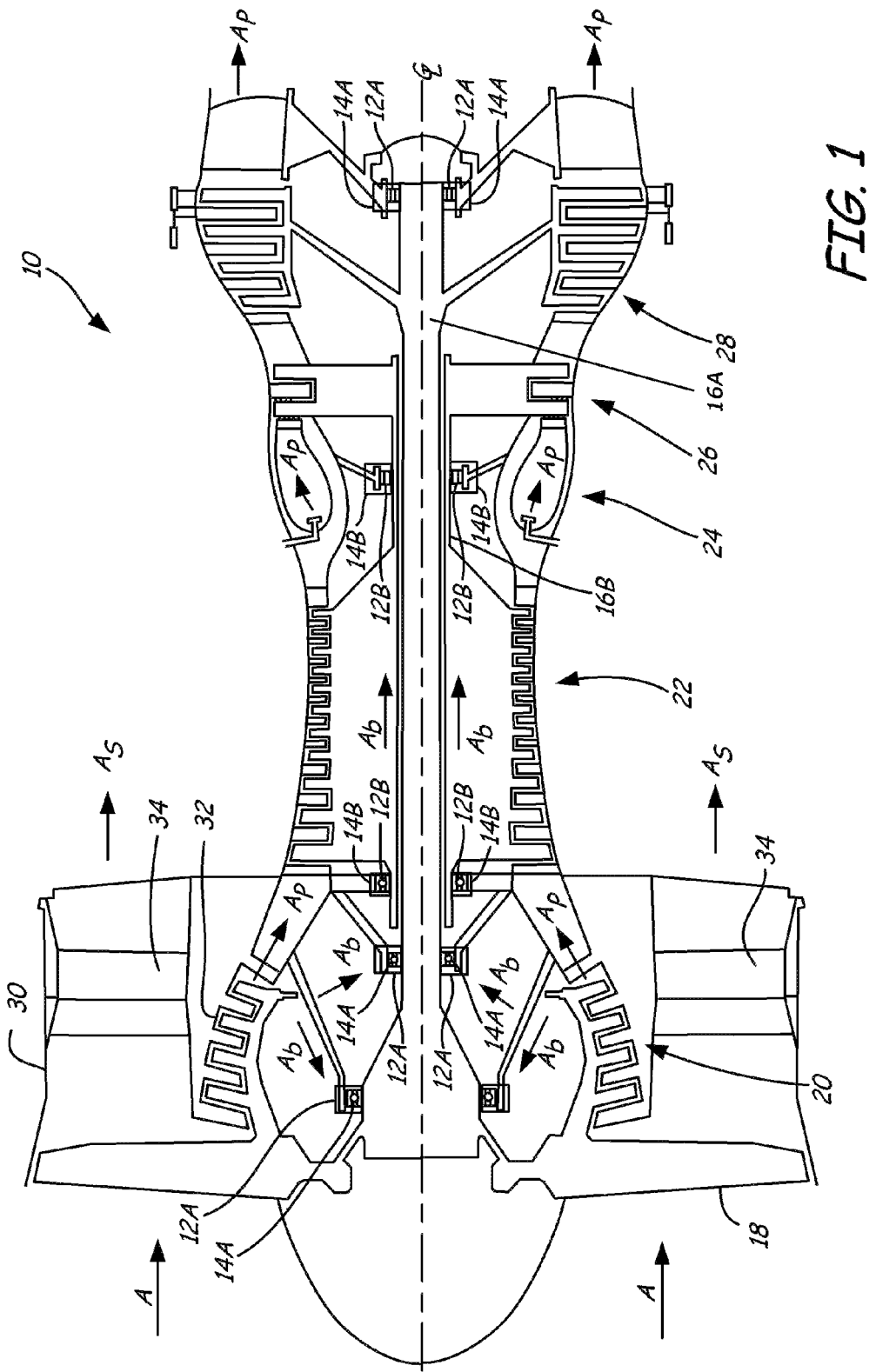
FIG. 1 is a schematic cross-sectional view of one embodiment of a gas turbine engine in which bearings and bearing compartments are utilized.

FIG. 1 shows a schematic cross section of a gas turbine engine 10 in which bearing compartments 12A and 12B are used to house anti-friction bearings 14A and 14B that support shafts 16A and 16B. For simplicity, in the embodiment shown the gas turbine engine 10 is schematically shown with only two shafts 16A and 16B rather than several shafts. The gas turbine engine 10 can comprise a high bypass ratio turbofan engine or another type of gas turbine engine used for aircraft propulsion or power generation.

The gas turbine engine 10, of which the operational principles are well known in the art, includes a fan 18, a low pressure compressor (LPC) 20, a high pressure compressor (HPC) 22, a combustor section 24, a high pressure turbine (HPT) 26 and a low pressure turbine (LPT) 28, which are each concentrically disposed around an axial engine centerline CL. The fan 18, the LPC 20, the HPC 22, the HPT 26, the LPT 28 and other engine components are enclosed at their outer diameters within various engine casings, including a fan case 30 and a LPC case 32.

The fan 18 and the LPC 20 are connected to LPT 28 through shaft 16A, which is supported by the anti-friction bearings 14A. The anti-friction bearings 14A are housed within bearing compartments 12A. To lubricate the anti-friction bearings 14A and 14B, lubricant is fed into the bearing compartments 12A and 12B from other portions of the engine 10. Together, the fan 18, the LPC 20, the LPT 28 and the shaft 16A comprise the low pressure spool. The HPC 22 is connected to the HPT 26 through shaft 16B, which is supported within engine 10 by anti-friction bearings 14B housed in the bearing compartments 12B. Together, the HPC 22, the HPT 26 and the shaft 16B comprise the high pressure spool.

Inlet air A enters engine 10 whereby it is divided into streams of a primary air $A_P$ and a secondary air $A_S$ after passing through the fan 18. The fan 18 is rotated by the low pressure turbine 26 through the shaft 16A to accelerate the secondary air $A_S$ (also known as bypass air) through exit guide vanes 34, thereby producing a significant portion of the thrust output of engine 10. The primary air $A_P$ (also known as gas path air) is directed first into the low pressure compressor 20 and then into high pressure compressor 22. The LPC 20 and the HPC 22 work together to incrementally increase the pressure and temperature of primary air $A_P$. High pressure buffer air $A_b$ (also known as pressurization air) is bled off one or more of the stages of the LPC 20 or HPC 22 and is supplied to the bearing compartments 12A and 12B. Buffer air $A_b$ is also supplied to other components of the engine 10 for anti-icing purposes and to remove debris from engine 10.

The HPC 22 is rotated by HPT 26 through shaft 16B to provide compressed air to combustor section 24. The compressed air is delivered to combustor 24, along with fuel from the injectors, such that a combustion process can be carried out to produce high energy gases necessary to turn high pressure turbine 26 and low pressure turbine 28. Primary air $A_P$ continues through gas turbine engine 10 whereby it is typically passed through an exhaust nozzle to further produce thrust.

Figure 2:
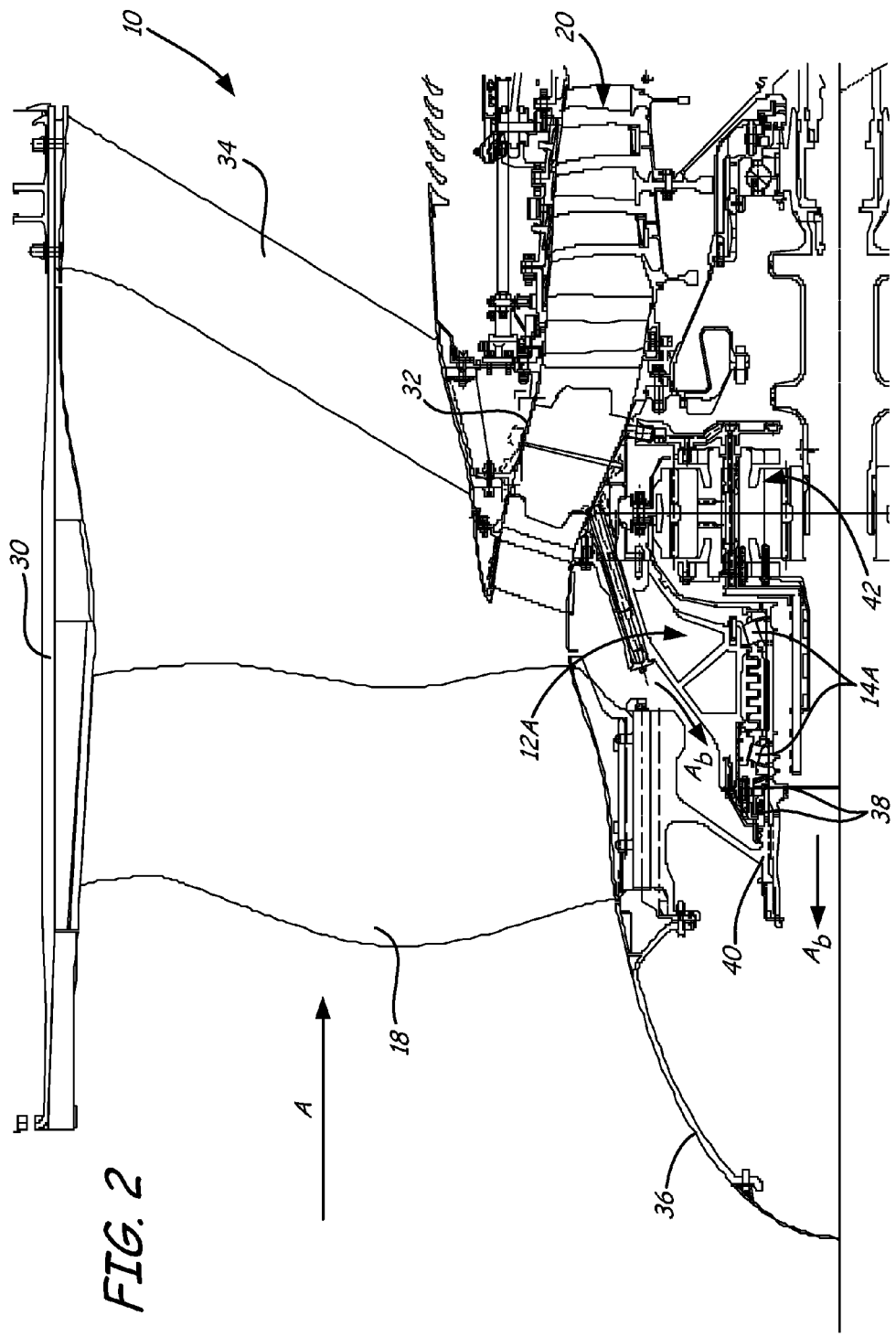
FIG. 2 is a schematic cross-section of a forward portion of the gas turbine engine.

FIG. 2 shows a forward section of the gas turbine engine 10 above centerline CL (FIG. 1). In addition to the bearing compartment 12A, the anti-friction bearings 14A, the fan 18, the low pressure compressor 20, the fan case 30, the LPC case 32, and the guide vanes 34, the engine 10 includes a fan nose 36, bearing compartment seals 38, a fan hub 40 and an epicyclic gear assembly 42.

The bearing compartment 12A shown in FIG. 2 is disposed in a forward portion of the gas turbine engine 10 adjacent the fan 18 and fan nose 36. The buffer air $A_b$ and lubricating oil are supplied to the bearing compartment 12A. The oil lubricates the anti-friction bearings 14A and an interior portion of the bearing compartment seals 38. The buffer air $A_b$ is initially supplied to the exterior portion of the bearing compartment seals 38 along an air flow path. Upon reaching the bearing compartment seals 38, a pressure differential between the interior of the bearing compartment 12A and the buffer air $A_b$ along with the configuration of the bearing compartment seals 38, allows the buffer air $A_b$ to migrate across the bearing compartment seals 38 into the bearing compartment 12A. The operation and configuration of similar bearing compartments and bearing compartment seals are further detailed in U.S. Pat. Nos. 7,287,384 and 4,709,545, which are herein incorporated by reference.

The buffer air $A_b$ is also directed to the fan nose 36 to provide anti-icing heat to that feature. In the embodiment shown, the bearing compartment 12A is stationarily mounted within the gas turbine engine 10 adjacent the rotating fan hub 40. The epicyclic gear assembly 42 transfers rotation from one of the shafts within the gas turbine engine 10 to other turbomachinery including the rotating fan hub 40 (a shaft). As will be further detailed subsequently, in one embodiment, the fan hub 40 has a baffle (not shown) and the bearing compartment 12A has a capture annulus (not shown). The baffle and capture annulus are disposed upstream (as defined by the direction of flow of the buffer air $A_b$) of the bearing compartment seals 38 and are configured to separate debris from the buffer air $A_b$ prior to the buffer air $A_b$ reaching the bearing compartment seals 38. The separated debris is then evacuated away from the bearing compartment 12A and is carried by a portion of the buffer air $A_b$ into either the anti-icing flow or to other portions of the gas turbine engine 10 before eventually being expelled from the engine 10 altogether.

Figure 3:
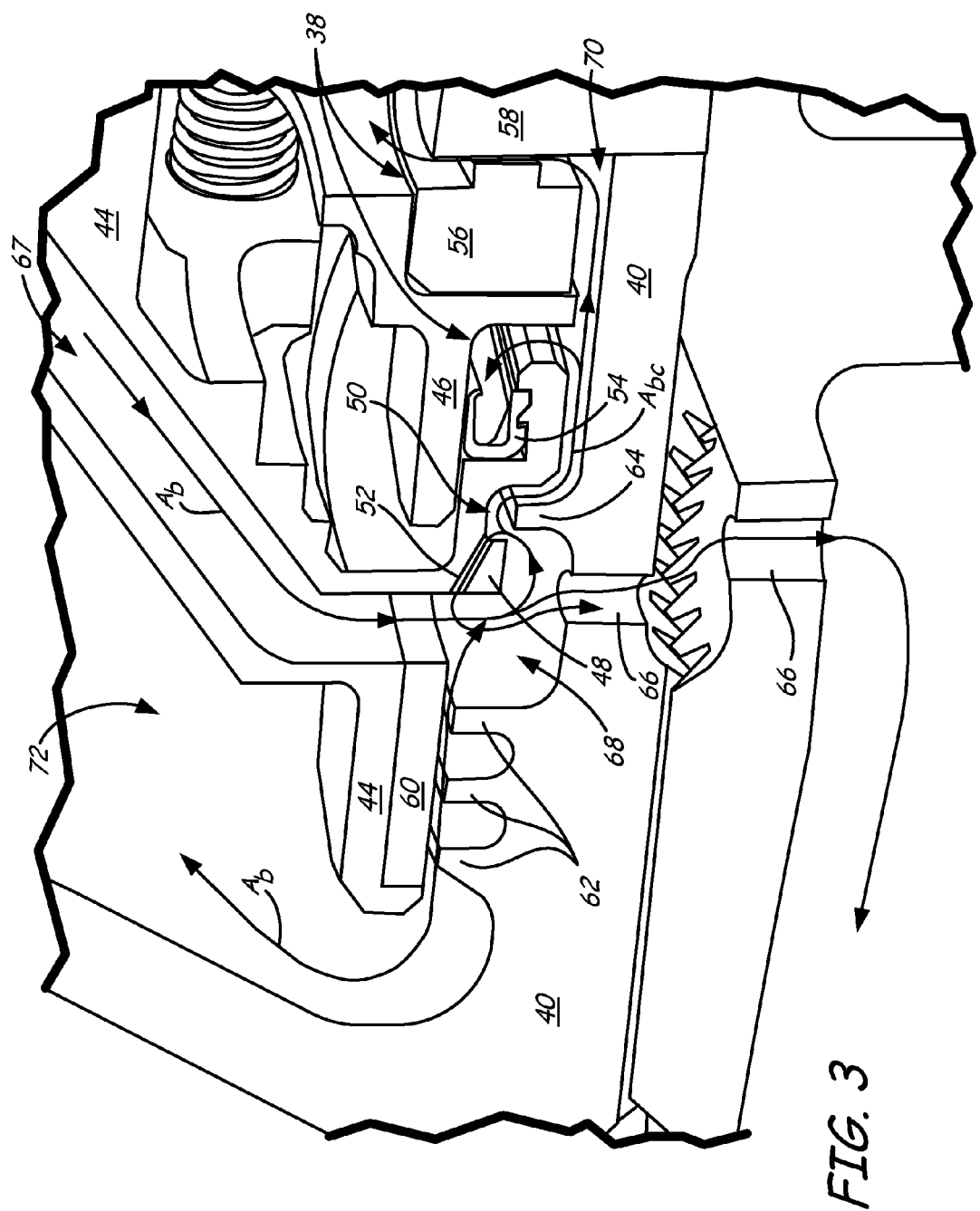
FIG. 3 is a perspective cross-sectional view of a forward portion of one bearing compartment including bearing compartment seals.

FIG. 3 shows a perspective cross-sectional view of a forward portion of the bearing compartment 12A and also illustrates the bearing compartment seals 38. The bearing compartment 12A includes a seal housing 44, a seal carrier 46, and a capture annulus 48 having a cavity or trench 50 and channel 52. The bearing compartment seals 38 include a secondary seal 54, a carbon seal 56, and a seal plate 58. An abradable seal land 60 is disposed between the seal housing 44 and the fan hub 40. The fan hub 40 includes a labyrinth plate seal 62, a baffle or rib 64, and an anti-icing air supply hole 66.

The stationary bearing compartment 12A is disposed within the gas turbine engine 10 (FIGS. 1 and 2) adjacent the rotating fan hub 40. The seal housing 44 comprises a forward portion of the bearing compartment 12A. The seal housing 44 is bolted to an open side of the bearing compartment 12A and holds at least one of the bearing compartment seals 38. The seal carrier 46 is partially disposed within the seal housing 44. The radially inner portion of the seal housing 44 adjacent the seal carrier 46 comprises the capture annulus 48. The trench 50 extends generally radially inward into the capture annulus 48. The capture annulus 48 and trench 50 extend arcuately adjacent the fan hub 40. The channel 52 (in one embodiment a plurality of about 15 to 50 channels) extends through the capture annulus 48 to communicate with the cavity 50. The number and diameter of the channels can very depending on design criteria such as the model of turbine engine utilized.

Together the seal housing 44 and seal carrier 46 support the secondary seal 54 therebetween. The secondary seal 54 is one of the bearing compartment seals 38. The seal carrier 46 connects to the carbon seal 56 and helps to keep the carbon seal 56 in contact with the seal plate 58. The seal housing 44 defines a buffer air supply channel 67 that allows the flow of buffer air $A_b$ into a buffer air supply cavity 68 adjacent the seal housing 44 and the fan hub 40. From the buffer air supply cavity 68 the buffer air $A_b$ can communicate with and become the anti-icing air flow and can also communicate (through a passage 70 between the seal housing 44 and the fan hub 40) with the secondary seal 54, the carbon seal 56, and the seal plate 58 (together collectively the bearing compartment seals 38). The anti-icing air supply hole 66, in one embodiment a plurality of anti-icing holes 66 are utilized to allow for communication between the fan nose 36 (FIG. 2) and the buffer air supply cavity 68. During operation a portion of the buffer air $A_b$ enters the anti-icing holes 66 and is sent to the fan nose 36 (FIG. 2) to perform anti-icing functions. After performing these functions the air is then expelled from the gas turbine engine 10.

A forward portion of the seal housing 44 is adapted with a flange that receives the abradable seal land 60. The abradable seal land 60 is disposed adjacent the labyrinth plate seal 62 upstream (as defined by the direction of buffer air $A_b$ flow) of the secondary seal 54, the carbon seal 56, and the seal plate 58. Together the abradable seal land 60 and the labyrinth plate seal 62 create a back pressure sufficient to generate the buffer air $A_b$ flow for anti-icing and sealing. The baffle 64 extends radially outward from and is integral with the fan hub 40. The baffle 64 is disposed along passage 70 such that it is positioned in the buffer air $A_b$ flow upstream (as defined by the direction of buffer air $A_b$ flow) of the secondary seal 54, the carbon seal 56, and the seal plate 58.

The seal housing 44 is hollow and arcuate in shape and separates the lubrication fluid from the buffer air $A_b$ entering the buffer air supply cavity 68. Thus, the interior walls of the seal housing 44, the seal carrier 46 and the secondary seal 54 are coated in lubricant. The secondary seal 54, disposed between the seal housing 44 and seal carrier 46, is configured to create a lubricant seal in the forward and aft directions. The outwardly radial portions (interior portion of the bearing compartment 12A) of the seal carrier 46, the carbon seal 56, and the seal plate 58 are similarly wetted by lubricant. The carbon seal 56 rubs against the rotating seal plate 58 and seals the lubricant within the bearing compartment 12A. The seal plate 58 and carbon seal 56 are configured to allow as small amount of "cleaner" buffer air $A_{bc}$ into the bearing compartment 12A to aid in the prevention of lubricant leakage out of the bearing compartment 12A.

The buffer air $A_b$, which may contain debris, flows into the buffer air supply cavity 68 from the buffer air supply channel 67. From the buffer air supply cavity 68, a portion of the buffer air $A_b$ communicates between the abradable seal land 60 and the labyrinth plate seal 62 which provide backpressure to the system. Some portion of the buffer air $A_b$ passes across the abradable seal land 60 and the labyrinth plate seal 62 away from the buffer air supply cavity 68 and enters an outer cavity 72 before being expelled from the gas turbine engine 10

(FIGS. 1 and 2). In some instances, the abradable seal land 60 and the rotating labyrinth plate seal 62 can introduce debris into the buffer air $A_b$. This debris enters the buffer air supply cavity 68 upstream of the bearing compartment seals 38. From the buffer air supply cavity 68, a portion of the buffer air $A_b$ flows toward the passage 70 and encounters the rotating baffle 64, which is positioned in the flow path of the buffer air $A_b$ upstream of the bearing compartment seals 38. The annular baffle 64 is disposed adjacent the capture annulus 48, and in particular, is disposed radially inward of the cavity 50.

The baffle 64 is shaped to direct the debris laden buffer air $A_b$ flow radially upward away from the baffle 64 toward the capture annulus 48 and cavity 50. The shape of the baffle 64 and the direction of the flow toward the bearing compartment seals 38 then forces the debris laden buffer air $A_b$ to make a sharp turn (in the embodiment shown a turn of about 90 degrees). The larger inertia of the debris (as opposed to clean air) does not allow the debris to make this turn. Thus, the debris continues along a flow path into the cavity 50 that is separate from that of the cleaner buffer air $A_{bc}$ which continues on to passage 70 and the bearing compartment seals 38.

Additionally, the rotation of the baffle 64 relative to the debris laden buffer air $A_b$ flow energizes and accelerates the buffer air $A_b$ to induce a swirl or rotation therein. The centrifugal forces resulting from the rotation of the buffer air $A_b$ flow push the heavier debris radially away from the rotating baffle 64. In this manner, the debris is centrifuged radially outward from the baffle 64 into the cavity 50 where it is captured. The cavity 50 captures the debris, and holds it separate from the cleaner buffer air $A_{bc}$ flow which continues around baffle 64 to passage 70 and the bearing compartment seals 38.

The cavity 50 is configured to extend radially inward into the capture annulus 48 and axially forward and aft of the baffle 64 to a sufficient distance to allow the debris captured within the cavity 50 to be substantially outside of the flow path of the cleaner buffer air $A_{bc}$ stream. In one embodiment, this is achieved by configuring the radial depth of the cavity 50 to have a ratio of about 1:1 when compared to the radial height of the baffle 64. In other embodiments, the ratio of the radial depth of the cavity 50 to the radial height of the baffle 64 can be greater or less than 1:1 depending on design criteria, for example, the rate of flow of the buffer air $A_b$. The channel 52 extends through the capture annulus 48 forward of the baffle 64 to allow for evacuation and re-circulation of the debris from the cavity 50 to the buffer air supply plenum 68. From the buffer air supply plenum 68 the re-circulated debris enters the anti-icing flow or crosses the seal land 60 and the labyrinth plate seal 62, and in either instance, is eventually expelled from the gas turbine engine 10 (FIGS. 1 and 2).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of separating debris from a pressurization air stream so as to supply cleaner pressurization air to a bearing compartment seal, the method comprising:
   directing the pressurization air stream around a baffle disposed upstream of the bearing compartment seal wherein the baffle is integral with a fan hub and rotates therewith and a capture annulus is a portion of a bearing compartment; and
   capturing the debris in a cavity of a member disposed adjacent the baffle.

2. The method of claim 1 and further comprising rotating the baffle to induce rotation of the pressurization air stream.

3. The method of claim 1 and further comprising evacuating the debris from the cavity to a buffer air supply plenum.

4. The method of claim 3, wherein between about 15 and 50 channels are annularly arrayed along the member.

5. The method of claim 1, wherein the cavity extends into the member to a distance sufficient to allow the captured debris to be outside of a flow path of the cleaner pressurization air.

6. An assembly for separating debris from a pressurization air flow adjacent a bearing compartment seal in a fan section of an engine, the assembly comprising:
   a baffle positioned in the pressurization air flow upstream of the compartment seal; and
   a capture annulus disposed adjacent the baffle and having a cavity to collect the debris;
   wherein the baffle is integral with a shaft and rotates therewith and the capture annulus comprises a portion of a bearing compartment.

7. The assembly of claim 6 and further comprising channels that extend through the capture annulus to allow for evacuation of the debris from the cavity to a buffer air supply plenum.

8. The assembly of claim 7, wherein between about 15 and 50 channels are arrayed along the capture annulus.

9. The assembly of claim 6, wherein the baffle extends into the capture annulus to a distance sufficient to allow the captured debris to be substantially outside of a flow path of a debris free air stream.

10. The assembly of claim 6, wherein the baffle rotates with rotating turbomachinery within a gas turbine engine.

11. The assembly of claim 10, wherein the baffle centrifugally accelerates the pressurization air flow to induce rotation thereof.

12. The assembly of claim 6, wherein the baffle is configured to change a direction of flow of the pressurization air.

13. The assembly of claim 6, wherein the baffle is spaced downstream from an upstream edge of the capture annulus in a direction of the air flow, and wherein the baffle and the capture annulus face in opposite directions.

14. A gas turbine engine, comprising:
   a bearing compartment mounted within a fan section of the gas turbine engine, the bearing compartment including a bearing compartment seal that is operably supplied with a pressurization air flow;
   a shaft rotatably mounted within the gas turbine engine adjacent the bearing compartment, the shaft having a baffle positioned in the pressurization air flow upstream of the compartment seal; and
   a capture annulus disposed adjacent the baffle and having a cavity to collect debris.

15. The gas turbine engine of claim 14, wherein the capture annulus includes channels that extend therethrough to allow for evacuation of the debris from the cavity to a plenum.

16. The gas turbine engine of claim 14, wherein the baffle is integral with the shaft which comprises a fan hub and the capture annulus comprises a portion of the bearing compartment.

17. The gas turbine engine of claim 14, wherein the baffle extends into the capture annulus to a distance sufficient to allow the captured debris to be substantially outside of a flow path of a debris free air stream.

18. The gas turbine engine of claim 14, wherein the baffle centrifugally accelerates the pressurization air flow to induce rotation thereof.

19. The gas turbine engine of claim 14, wherein the baffle is configured to change a direction of flow of the pressurization air flow.

\* \* \* \* \*